(12) United States Patent
Little et al.

(10) Patent No.: US 8,095,249 B2
(45) Date of Patent: *Jan. 10, 2012

(54) SYSTEM AND METHOD FOR DISPLAYING A DIGITAL TERRAIN

(75) Inventors: Michael C. Little, Peoria, AZ (US); Troy A. Nichols, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1162 days.

This patent is subject to a terminal disclaimer.

(21) Appl. No.: 11/849,450

(22) Filed: Sep. 4, 2007

(65) Prior Publication Data

US 2010/0070109 A1    Mar. 18, 2010

(51) Int. Cl.
*G01C 23/00* (2006.01)
(52) U.S. Cl. ........ 701/3; 701/14; 701/16; 340/963; 340/970; 340/975; 342/26 B; 342/350; 349/64
(58) Field of Classification Search ........ 701/3, 14, 701/16; 340/963, 970, 975; 342/26 B, 350; 349/64
See application file for complete search history.

(56) References Cited

U.S. PATENT DOCUMENTS

| | | | | |
|---|---|---|---|---|
| 3,010,175 | A * | 11/1961 | Shoemaker | 249/41 |
| 4,954,837 | A * | 9/1990 | Baird et al. | 342/458 |
| 5,179,638 | A * | 1/1993 | Dawson et al. | 345/582 |
| 5,961,572 | A * | 10/1999 | Craport et al. | 701/207 |
| 5,969,676 | A * | 10/1999 | Tran et al. | 342/442 |
| 5,974,423 | A | 10/1999 | Margolin | |
| 5,978,715 | A * | 11/1999 | Briffe et al. | 701/11 |
| 6,023,278 | A | 2/2000 | Margolin | |
| 6,038,498 | A * | 3/2000 | Briffe et al. | 701/3 |
| 6,112,141 | A * | 8/2000 | Briffe et al. | 701/14 |
| 6,489,962 | B1 | 12/2002 | Ambroziak et al. | |
| 7,209,070 | B2 * | 4/2007 | Gilliland et al. | 342/26 B |
| 7,215,256 | B2 * | 5/2007 | Reusser et al. | 340/975 |

(Continued)

FOREIGN PATENT DOCUMENTS

EP    2 037 216 A2 *  3/2009

OTHER PUBLICATIONS

Ho et al. Terrestrial Propagation of 2-Gigahertz Emissions Transmitted from the Deep Space Network 70-Meter Antenna at Robledo, Internet, 2003, p. 1-22.*

(Continued)

*Primary Examiner* — James Trammell
*Assistant Examiner* — McDieunel Marc
(74) *Attorney, Agent, or Firm* — Ingrassia Fisher & Lorenz, P.C.

(57) ABSTRACT

Methods and systems for displaying a digital terrain to a user of a vehicle are provided. First, second, and third actual terrain data points are received. The third actual terrain data point is between the first and second actual terrain data points. If the third actual terrain data point is above a line interconnecting the first and second actual terrain data points, the first actual terrain data point is modified such that the third actual terrain data point is not above a line interconnecting said modified first actual terrain data point and the second actual terrain data point. A digital terrain is displayed to the user of the vehicle. The digital terrain includes a first digital terrain data point corresponding to the modified first actual terrain data point.

20 Claims, 14 Drawing Sheets

U.S. PATENT DOCUMENTS

| | | | |
|---|---|---|---|
| 7,266,560 B2 * | 9/2007 | Lampert et al. | 1/1 |
| 7,295,901 B1 * | 11/2007 | Little et al. | 701/16 |
| 7,603,209 B2 * | 10/2009 | Dwyer et al. | 701/14 |
| 7,609,200 B1 * | 10/2009 | Woodell et al. | 342/176 |
| 7,724,177 B2 * | 5/2010 | Bunch et al. | 342/26 R |
| 7,873,240 B2 * | 1/2011 | Oldroyd | 382/294 |
| 7,889,117 B1 * | 2/2011 | Woodell et al. | 342/65 |
| 2003/0021491 A1 | 1/2003 | Brust | |
| 2003/0184450 A1 * | 10/2003 | Muller et al. | 340/963 |
| 2006/0013442 A1 | 1/2006 | McDowall et al. | |
| 2006/0077092 A1 * | 4/2006 | Gilliland et al. | 342/26 B |
| 2007/0010965 A1 * | 1/2007 | Malchi et al. | 702/151 |
| 2007/0171094 A1 * | 7/2007 | Alter et al. | 340/970 |
| 2007/0250223 A1 * | 10/2007 | Francois et al. | 701/9 |
| 2009/0195729 A1 * | 8/2009 | Little et al. | 349/64 |
| 2009/0312893 A1 * | 12/2009 | Dwyer et al. | 701/14 |
| 2009/0319103 A1 * | 12/2009 | Dwyer et al. | 701/14 |
| 2010/0036548 A1 * | 2/2010 | Nichols et al. | 701/4 |

OTHER PUBLICATIONS

EP Search Report, EP 08163612.8-2213/2037216 dated Jun. 9, 2011.
EP Communication, EP 08163612.8-2213 dated Jun. 21, 2011.

* cited by examiner

SYSTEM AND METHOD FOR DISPLAYING A DIGITAL TERRAIN

TECHNICAL FIELD

The present invention relates to digital displays, and more particularly, to a system and method for displaying a digital terrain to a user.

BACKGROUND

Many modern vehicles, such as aircraft, are equipped with a wide variety of electrical and computing systems that monitor and, in some instances, control various operational aspects of the aircraft. One of the tasks often performed by these systems is to gather information from various instruments, such as a compass and an altimeter, and display the information on single display device, such as a primary flight display (PFD).

PFDs are also often used to display, typically in a perspective view, the terrain over which the aircraft is flying, including the locations of various landmarks, such as landing strips. When combined with recent advances in satellite imaging and Global Position Systems (GPS), it is possible for modern computer systems to display the terrain on the PFD with a relatively high level of detail, including three-dimensional contouring. Situations arise in which the pilot, or other user, is trying to navigate the aircraft by viewing only the PFD (e.g., in severe weather or in a vehicle without windows). In such situations, the movement, spacing, and size of the features shown on the digital terrain assist the pilot by providing an indication of the altitude and speed of the aircraft.

In order to generate the images of the terrain, aircraft often utilize onboard databases that include terrain elevation data, such as Digital Elevation Model (DEM) data, in combination with other components, such as Global Positioning System (GPS) receivers. However, due to performance limitations of the processors that are used to generate the digital terrains, often not all of the available terrain elevation data is used. That is, in order to save system resources, the digital terrain is shown at a resolution lower than that of the terrain elevation data. This reduction in resolution is often performed by sampling the terrain elevation data and results in the terrain being shown less accurately than possible.

To ensure the accuracy with which the terrain is shown to the pilot, the terrain elevation data may be checked to ensure that none of the unselected data points have elevations that are higher than nearby selected data points. If unselected data points are found to be higher than nearby selected data, the elevation of the selected data is increased to that of the unselected data. Such a method results in such a conservative image of the terrain that down range features are often erroneously obscured from view on the PFD.

Accordingly, it is desirable to provide a method and system for displaying a digital terrain that more accurately represents the actual terrain while still only utilizing a portion of the possible terrain elevation data resolution. Furthermore, other desirable features and characteristics of the present invention will become apparent from the subsequent detailed description and the appended claims, taken in conjunction with the accompanying drawings and the foregoing technical field and background.

BRIEF SUMMARY

A method for displaying a digital terrain to a user of a vehicle is provided. First, second, and third actual terrain data points are received. The third actual terrain data point is between the first and second actual terrain data points. If the third actual terrain data point is above a line interconnecting the first and second actual terrain data points, the first actual terrain data point is modified such that the third actual terrain data point is not above a line interconnecting said modified first actual terrain data point and the second actual terrain data point. A digital terrain is displayed to the user of the vehicle. The digital terrain includes a first digital terrain data point corresponding to said modified first actual terrain data point.

A method for displaying a digital terrain to a user of an aircraft is provided. An array of actual terrain data points including a plurality of active actual terrain data points and a plurality of passive actual terrain data points is received. The array is arranged such that each pair of adjacent active actual terrain data points has a passive actual terrain data point therebetween. For each pair of adjacent active actual terrain data points, it is determined if the passive actual terrain data point therebetween is above a line interconnecting the pair of adjacent active actual terrain data points, and if the passive actual terrain data point is above the line, at least one of the active actual terrain data points within the pair is modified such that the passive actual terrain data point is not above the line. A digital terrain is displayed to the user of the aircraft. The digital terrain includes a plurality of digital terrain data points corresponding to said modified actual terrain data points.

An avionics system is provided. The avionics system includes a display device that is viewable by a user of an aircraft and a processor in operable communication with the display device. The processor is configured to receive first, second, and third actual terrain data points, the third actual terrain data point being between the first and second actual terrain data points, if the third actual terrain data point is above a line interconnecting the first and second actual terrain data points, modify the first actual terrain data point such that the third actual terrain data point is not above a line interconnecting said modified first actual terrain data point and the second actual terrain data point, and display a digital terrain to the user of the aircraft, the digital terrain including a first digital terrain data point corresponding to said modified first actual terrain data point.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
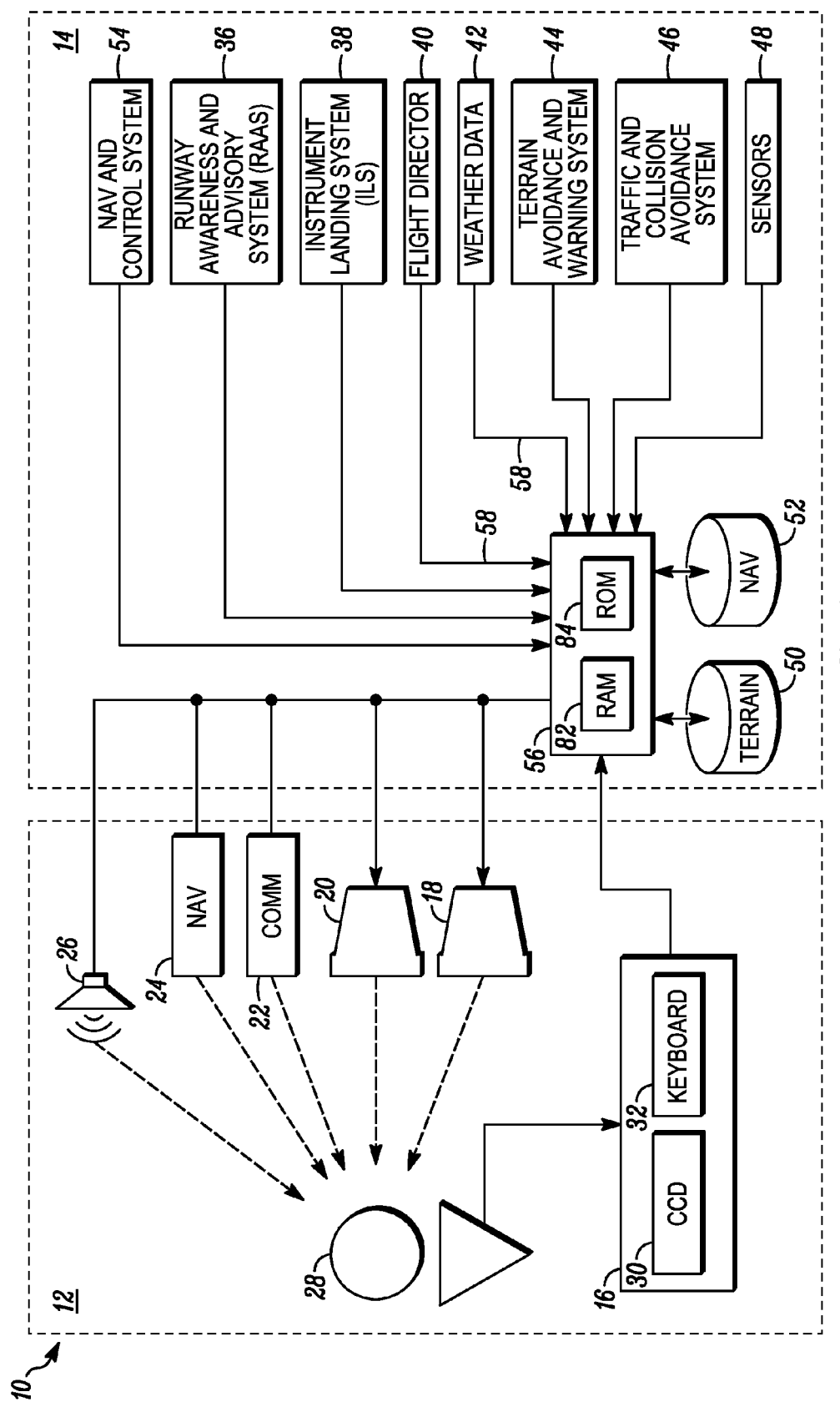
FIG. 1 is a block diagram schematically illustrating a vehicle including a flight deck and an avionics/flight system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices.

Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed.

It should be appreciated that the particular implementations shown and described herein are illustrative of the invention and its best mode and are not intended to otherwise limit the scope of the invention in any way. It should also be understood that FIGS. 1-17 are merely illustrative and may not be drawn to scale. It should also be noted that in several of the drawings a Cartesian coordinate system, including x, y, and z axes and/or directions, is shown to clarify the relative orientation of the components, according to the various embodiments. However, this coordinate system is only intended to assist in the explanation of various aspects of the present invention, and should be not construed as limiting, as other coordinate systems may be used, such a polar coordinate system.

FIG. 1 to FIG. 17 illustrate methods and systems for displaying a digital terrain to a user of a vehicle, according to one embodiment of the present invention. In general, first, second, and third actual terrain data points are received. The third actual terrain data point is between the first and second actual terrain data points. If the third actual terrain data point is above a line interconnecting the first and second actual terrain data points, the first actual terrain data point is modified such that the third actual terrain data point is not above a line interconnecting said modified first actual terrain data point and the second actual terrain data point. A digital terrain is displayed to the user of the vehicle. The digital terrain includes a first digital terrain data point corresponding to the modified first actual terrain data point.

FIG. 1 schematically illustrates a vehicle 10, such as an aircraft, according to one embodiment of the present invention. The vehicle 10 may be, in one embodiment, any one of a number of different types of aircraft such as, for example, a private propeller or jet engine driven airplane, a commercial jet liner, or a helicopter. In the depicted embodiment, the vehicle 10 includes a flight deck 12 (or cockpit) and an avionics/flight system 14. Although not specifically illustrated, it should be understood that the vehicle 10 also includes a frame or body to which the flight deck 12 and the avionics/flight system 14 are connected, as is commonly understood. It should also be noted that vehicle 10 is merely exemplary and could be implemented without one or more of the depicted components, systems, and data sources. It will additionally be appreciated that the vehicle 10 could be implemented with one or more additional components, systems, or data sources.

In one embodiment, the flight deck 12 includes a user interface 16, a first display device 18 (e.g., a primary flight display (PFD)), a second display device 20, a communications radio 22, a navigational radio 24, and an audio device 26. The user interface 16 is configured to receive input from a user 28 (e.g., a pilot) and, in response to the user input, supply command signals to the avionics/flight system 14. The user interface 16 may be any one, or combination, of various known user interface devices including, but not limited to, a cursor control device (CCD) 30, such as a mouse, a trackball, or joystick, and/or a keyboard, one or more buttons, switches, or knobs. In the depicted embodiment, the user interface 16 includes a CCD 30 and a keyboard 32. The user 28 uses the CCD 30 to, among other things, move a cursor symbol on the display devices 18 and 20, and may use the keyboard 32 to, among other things, input textual data.

Still referring to FIG. 1, the first and second display devices 18 and 20 are each used to display various images and data, in graphic, iconic, and/or textual formats, and to supply visual feedback to the user 28 in response to user input commands supplied by the user 28 to the user interface 16. It will be appreciated that the display devices 18 and 20 may each be implemented using any one of numerous known displays suitable for rendering image and/or text data in a format viewable by the user 28, such as a cathode ray tube (CRT) displays, a LCD (liquid crystal display), a TFT (thin film transistor) displays, or a heads up display (HUD) projection.

The communication radio 22 is used, as is commonly understood, to communicate with entities outside the vehicle 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

The avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48, one or more terrain databases 50, one or more navigation databases 52, a navigation and control system 54, and a processor 56. The various components of the avionics/flight system 14 are in operable communication via a data bus 58 (or avionics bus).

The RAAS 36 provides improved situational awareness to help lower the probability of runway incursions by providing timely aural advisories to the flight crew during taxi, takeoff, final approach, landing and rollout. The ILS 38 is a radio navigation system that provides aircraft with horizontal and vertical guidance just before and during landing and, at certain fixed points, indicates the distance to the reference point of landing. The flight director 40, as is generally known, supplies command data representative of commands for piloting the aircraft in response to flight crew entered data, or various inertial and avionics data received from external systems. The weather data source 42 provides data representative of at least the location and type of various weather cells. The TAWS 44 supplies data representative of the location of terrain that may be a threat to the aircraft, and the TCAS 46 supplies data representative of other aircraft in the vicinity, which may include, for example, speed, direction, altitude, and altitude trend. Although not illustrated, the sensors 48 may include, for example, a barometric pressure sensor, a thermometer, and a wind speed sensor.

The terrain databases 50 include various types of data representative of the terrain over which the aircraft may fly, and the navigation databases 52 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. In one embodiment, the terrain databases 50 include Digital Elevation Model (DEM) data. The DEM data may include elevation profiles of the terrain in various regions. As is commonly understood, the elevation profiles may be formed by dividing the terrain into small areas and assigning each area an elevation value (or a "z-value" in a three-dimensional Cartesian coordinate system). Each small area, along with its assigned elevation value, may be referred to as an "elevation post."

Figure 2:
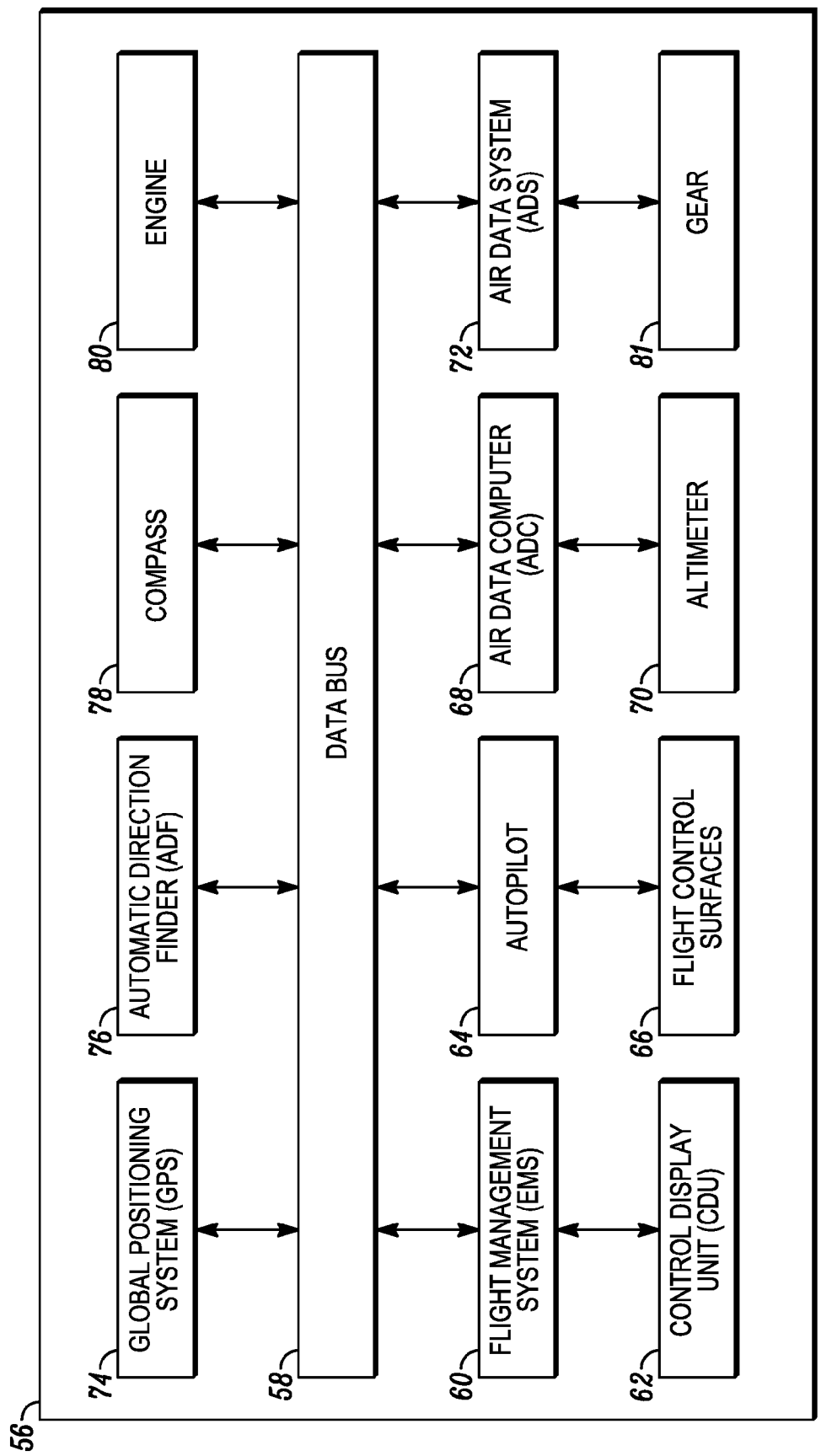
FIG. 2 is a block diagram of a navigation and control subsystem within the avionics/flight system of FIG. 1.

As illustrated in FIG. 2, the navigation and control system 54 includes a flight management system (FMS) 60, a control display unit (CDU) 62, an autopilot or automated guidance system 64, multiple flight control surfaces 66 (e.g., ailerons, elevators, and a rudder), an Air Data Computer (ADC) 68, an altimeter 70, an Air Data System (ADS) 72, a Global Positioning Satellite (GPS) system 74, an automatic direction (ADF) 76, a compass 78, at least one engine 80, and gear (i.e., landing gear) 81.

The FMS 60, in one embodiment, is a computerized avionics component that is used to assist the pilot, or pilots, in navigating and managing the vehicle 10 by utilizing various other components of the navigation and control system 54, such as the CDU 62 and the autopilot 64 shown in FIG. 2, as well as the avionics system 14 shown in FIG. 1.

Although not shown in FIG. 2, the ADS 72 may include a pitostatic tube system, as is commonly understood in the art. The navigation and control system 54 may also incorporate the data bus 58, through which the various components of the navigation and control system 54, as well as the entire vehicle 10, may be in operable communication. It should be understood that the vehicle 10 shown in FIGS. 1 and 2 is merely of an example of an embodiment of the invention. As such, the vehicle 10 may include other components, system, and subsystems, as will be appreciated by one skilled in the art, such as military devices, such as weapons and targeting systems, and additional systems, such as a Ram Air Turbine (RAT) system.

Referring now to FIG. 1, the processor 56 may be any one of numerous known general-purpose microprocessors or an application specific processor that operates in response to program instructions. In the depicted embodiment, the processor 56 includes on-board random access memory (RAM) 82, and on-board read only memory (ROM) 84. The program instructions that control the processor 56 may be stored in either or both the RAM 82 and the ROM 84. For example, the operating system software may be stored in the ROM 84, whereas various operating mode software routines and various operational parameters may be stored in the RAM 82. It will be appreciated that this is merely exemplary of one scheme for storing operating system software and software routines, and that various other storage schemes may be implemented. It will also be appreciated that the processor 56 may be implemented using various other circuits, not just a programmable processor. For example, digital logic circuits and analog signal processing circuits could also be used.

During operation, the processor 56 receives various types of information about the position and orientation of the aircraft 10 from, for example, the GPS system 74, the ADF 76, the compass 78, the altimeter 70, the ADS 72, as well information about the terrain over which the aircraft 10 is flying from, for example, the terrain and navigational databases 50 and 52 to generate a perspective view of the terrain as seen from the aircraft (e.g., through a window or a windshield).

Figure 3:
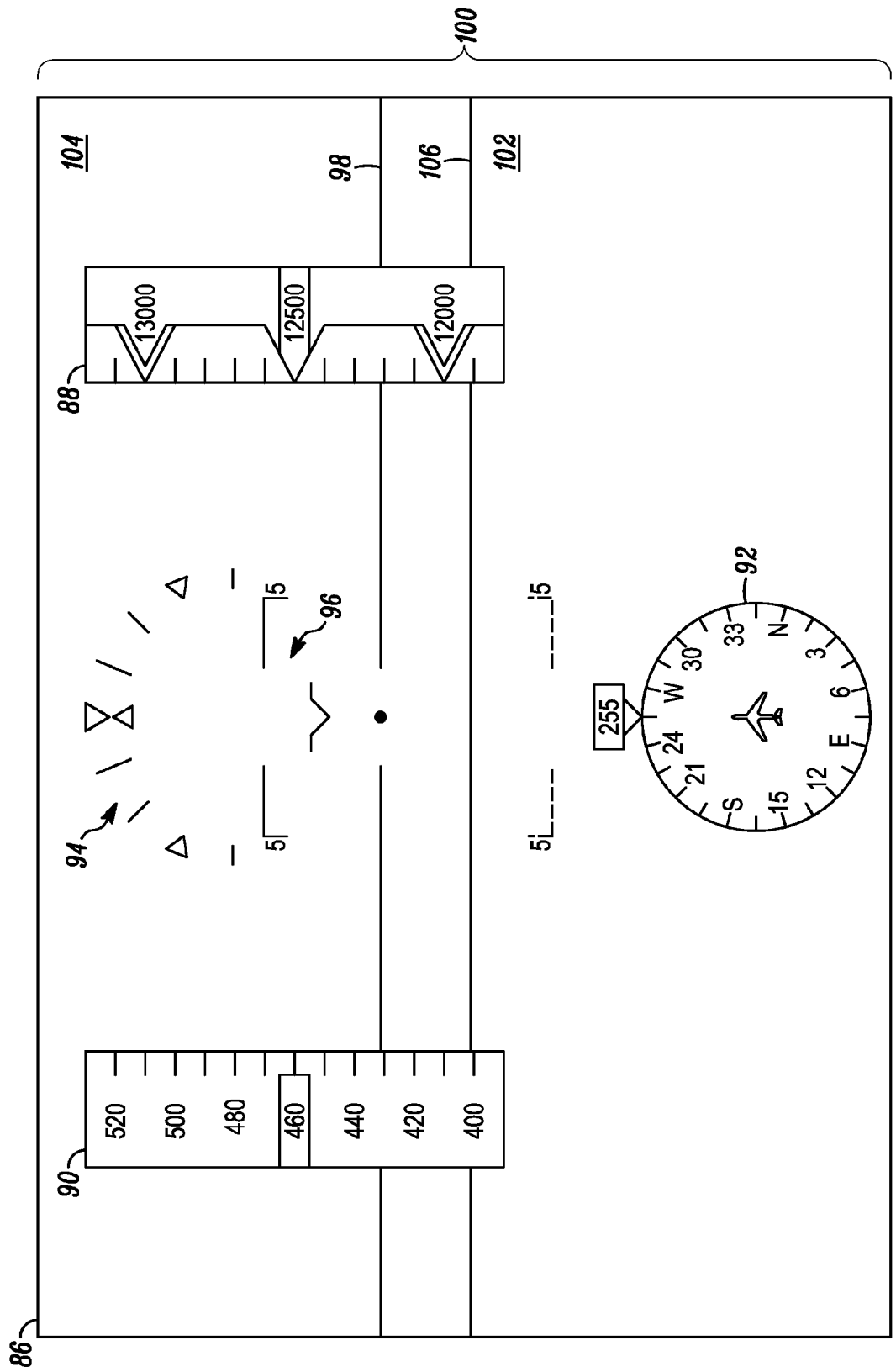
FIG. 3 is a top view of a primary flight display on the flight deck of FIG. 1 displaying a perspective view of a digital terrain.

FIG. 3 illustrates a display screen (or surface) 86 of the primary flight display 18. On the display screen 86 are displayed multiple digital instruments, including an altitude indicator 88, an airspeed indicator 90, a heading indicator 92, a roll indicator 94, a pitch indicator 96 (including a horizon bar 98), and a terrain image 100. In the embodiment illustrated, the altitude indicator 88 and the airspeed indicator 90 are displayed as an altitude tape and an airspeed tape, respectively, as is commonly understood. The heading indicator 92 is graphically displayed as a compass at a lower center portion of the display screen 86. The roll indicator 94 is displayed above the heading indicator 92 at an upper portion of the display screen, and the pitch indicator 96 is positioned between the heading indicator 92 and the roll indicator 94. The horizon bar 98 extends horizontally near the center of the screen 86, through the pitch indicator 96. The digital instruments 88-96 provide an indication of a position and/or orientation (i.e., heading, pitch, roll, etc.) of the aircraft 10 to the user 28.

In the exemplary embodiment shown in FIG. 3, the terrain image 100 depicts a perspective view from the aircraft 10 of the terrain outside the aircraft 10 (or actual terrain) and covers substantially the entire display screen 86. The terrain image 100 includes a terrain portion (or digital terrain) 102, a sky portion (or digital sky) 104, and a horizon line 106. As is commonly understood, the terrain image 100 is generated based on multiple readings from various instruments onboard the aircraft 10 that provide a current position and/or orientation (e.g., heading) of the aircraft 10 and changes as the position and/or orientation of the aircraft 10 changes. In the example shown in FIG. 3, the terrain image 100 is shown with a flat, featureless terrain. However, as described in greater detail below, in the event that the aircraft 10 flies over terrain features (e.g., hills, mountains, valleys, etc.), such features are show on the terrain image 100 to assist the user 28 with the operation of the aircraft 10.

In one embodiment, the processor 56 receives DEM data from the terrain databases 50 in conjunction with data concerning the position and heading of the aircraft 10 from other components, such as the GPS 74, the ADF 76, and the compass 78. The DEM data may be considered an array of points, or "elevation posts," within a three-dimensional Cartesian coordinate system, with the x and y-values of each point jointly representing the longitude and latitude of the posts and the z-value representing the elevation of the posts. As will be described in greater detail below, the points are divided into "active" and "passive" points which are arranged such that a passive point lies between every two active points. As such, each respective active point may be used to form pairs of active points with adjacent active points, with a passive point lying between the two active points. For every pair that may be formed with each active point, the processor 56 determines if the respective passive point is above a line interconnecting the two active points. If so, the elevation of the respective active point is increased according to the calculations described below, and the highest calculated elevation for the active point is stored. After performing a similar process for all of the active points, the processor 56 uses the stored values of the elevations of the active points to generate a digital terrain.

Figure 4:
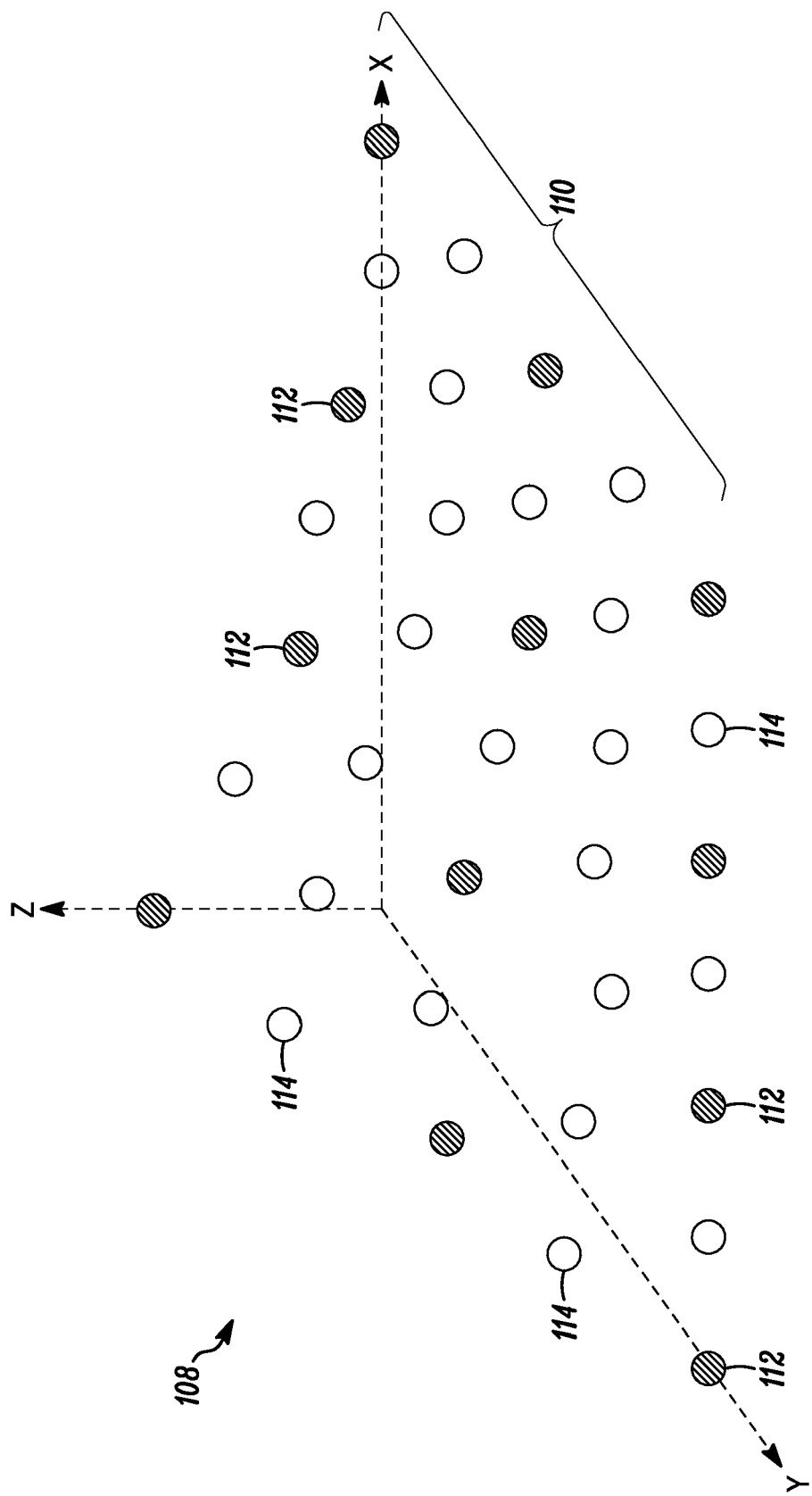
FIG. 4 is an isometric view of an array of terrain elevation data points in conjunction with a three-dimensional Cartesian coordinate system.
Figure 5:
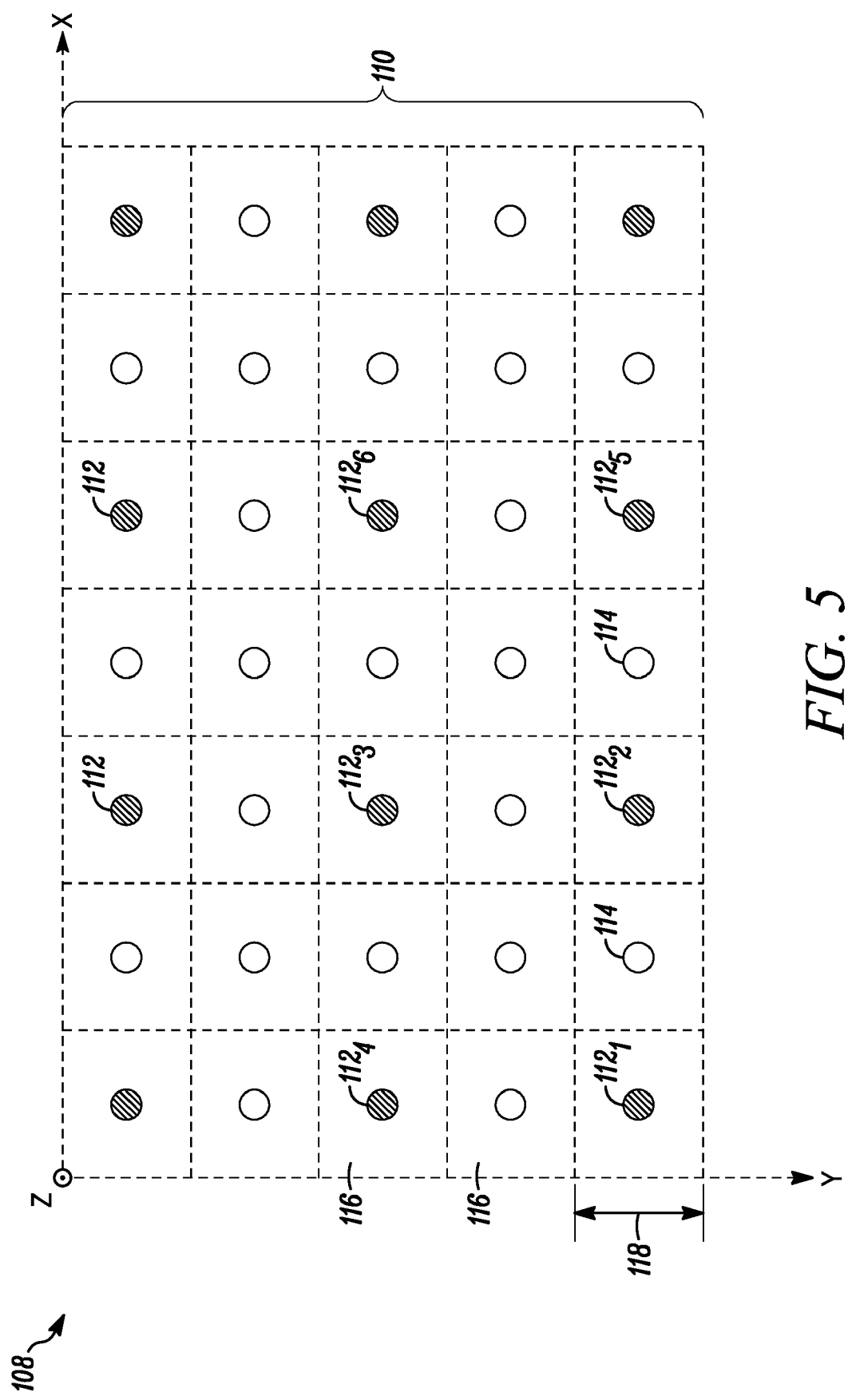
FIG. 5 is a view of the array of FIG. 4 in a direction parallel to the z-axis of the Cartesian coordinate system.

FIGS. 4 and 5 illustrate an example of terrain elevation data (e.g., DEM data). The terrain elevation data includes an array 108 (or portion of an array) of "actual terrain" data points 110 that are representative of a portion the terrain outside the aircraft 10. The data points 110 include "active" actual terrain data points (or active data points) 112 and "passive" actual terrain data points (or passive data points) 114. Referring specifically to FIG. 5, each of the actual terrain data points 110 is positioned within an elevation post 116, which represents the area of actual terrain which is represented by the respective data point 110. In the example shown in FIG. 5, the elevation posts 116 are substantially square with side lengths 118 that represent, for example, 600 meters of actual terrain.

Referring again to FIGS. 4 and 5, the array 108 may be understood in relation to the three-dimensional Cartesian coordinate system shown in which the x and y-axes jointly correspond to the longitude and latitude of a particular location on the terrain, while the z-axis corresponds to the elevation. As such, the array 108 provides an elevation profile by dividing the terrain into smaller sections, represented by a single point, and assigning each point an elevation that is represented by its value on the z-axis. It should be noted that such an elevation profile may also be provided with a two-dimensional Cartesian coordinate system in which each of the points is also assigned a value to represent the elevation.

Referring again to FIG. 5, the active data points 112 and the passive data points 114 are arranged such that a passive data point 114 lies between every two (or each pair) adjacent active data points 112 (at least when viewed in a direction parallel to the z-axis). In one embodiment, the passive data point 114 between a respective pair of active data points 112, when viewed in a direction parallel to the z-axis, is directly between the active data points 112 such that a plane interconnecting the three points would be parallel to the z-axis.

As such, the active data points 112 located near the center of the array 108 are each immediately surrounded by eight passive data points 114 and have eight adjacent active data points 112. The active data points 112 on the sides of the array 108 are each immediately surrounded by six passive data points 114 and have six adjacent active data points 112. The active data points 112 at the corners of the array 108 are each immediately surrounded by three passive data points 114 and have three adjacent active data points 112. Therefore, each of the active data points 112 located near the center of the array 108 may form eight pairs of active data points 112, the active data points 112 along the sides of the array may form six pairs, and the active data points 112 at the corners of the array 108 may form three pairs. For any passive data point 114, there is at least one pair of active data points 112 on opposing sides thereof, including those active data points 112 in elevation posts 116 contacting only the corners of the elevation post 116 of the respective passive data point 114.

In one embodiment, the processor 56 generates a digital terrain including digital terrain data points that correspond to only the active data points 112 (i.e., the digital terrain does not include points that correspond to the passive data points 114). The generation of the digital terrain is performed by a calculation utilizing the elevations (or "z-values") of the active data points 112 and the passive data points 114.

FIGS. 6-10 illustrate a method for generating a digital terrain utilizing the array 108 shown in FIGS. 4 and 5, in accordance with one embodiment of the present invention. Beginning at, for example, the active data point $112_1$ (at the lower, left corner of the array 108 in FIG. 5), the method checks each active data point 112 individually by comparing its elevation, along with that of the adjacent active data points 112, to the elevations of the passive data points 114 that are positioned between. In particular, in one embodiment, is it determined whether or not the passive data point 114 lying between each pair of active data points 112 that can be formed with the respective active data point 112 and all of the adjacent active data points 112 is above, or not below, (i.e., has a greater z-value than) a line that intersects the active data points 112 in the respective pair.

Figure 6:
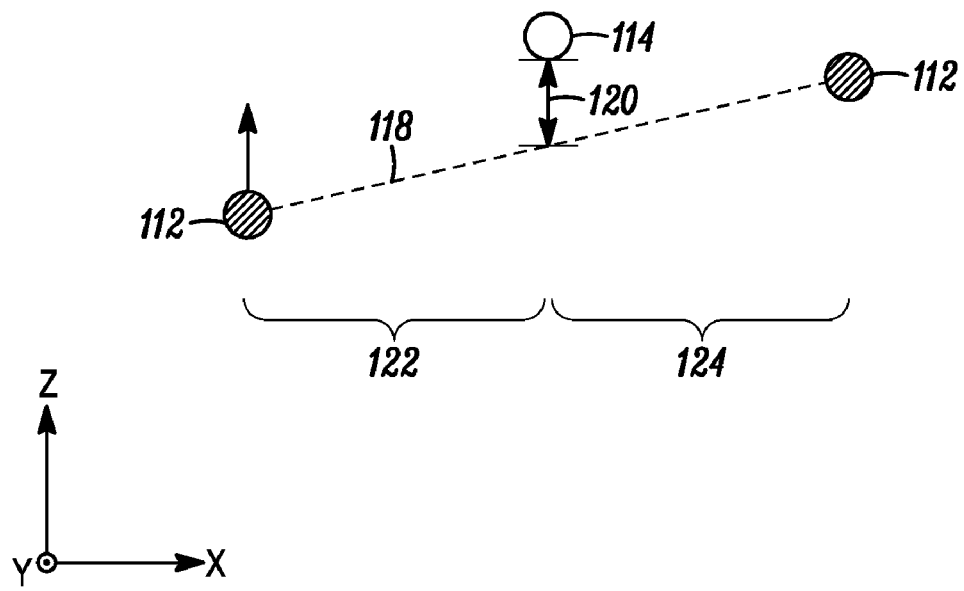
FIG. 6 is a view of three of the terrain elevation data points of FIG. 4 in a direction parallel to the y-axis of the Cartesian coordinate system.

FIG. 6 illustrates a passive data point 114 which is above a line 118 interconnecting the active data points 112 of the respective pair. In each case in which the passive data point 114 is determined to be above the line 118, a modified elevation of the particular active data point 112 (e.g., lower, left corner of the array 108) is stored to be used in generating the digital terrain. The modified elevation is, for example, the sum of the elevation of the particular active data point 112 and the difference between the elevation of the passive data point 114 and the line 118 (i.e., distance 120).

Figure 7:
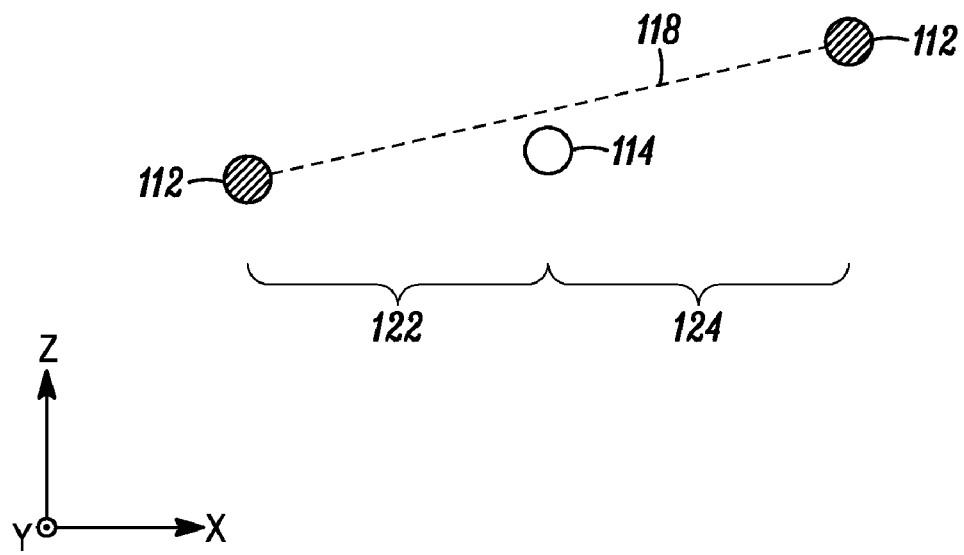
FIG. 7 is a view of three of the terrain elevation data points of FIG. 4 in a direction parallel to the y-axis of the Cartesian coordinate system.

FIG. 7 illustrates a passive data point 114 which is below (or not above) the line 118. In each case in which the passive data point 114 is determined to not to be above the line 118, an un-modified elevation (or simply the elevation) of the particular active data point 112 is stored to be used in generating the digital terrain.

Referring again to FIG. 5, for active data point $112_1$, the determination described above is made for the following pairs of active data points: $112_1$ and $112_2$, $112_1$ and $112_3$, and $112_1$ and $112_4$. After the calculations described above have been performed for each pair of adjacent active data points 112 that can be formed with the respective active data point 112, the highest modified elevation for the particular active data point is stored (e.g., in RAM 82) and the process moves to the next active data point 112, where the calculations described above are repeated for every possible pair of active data points 112 for the respective active data point 112.

For example, still referring to FIG. 5, after the determination is made for all the active data point pairs for active data point $112_1$, the process moves to active data point $112_2$. The determination described above is then made for the following pairs of active data points: $112_2$ and $112_5$, $112_2$ and $112_6$, $112_2$ and $112_3$, $112_2$ and $112_4$, and $112_2$ and $112_1$.

Figure 8:
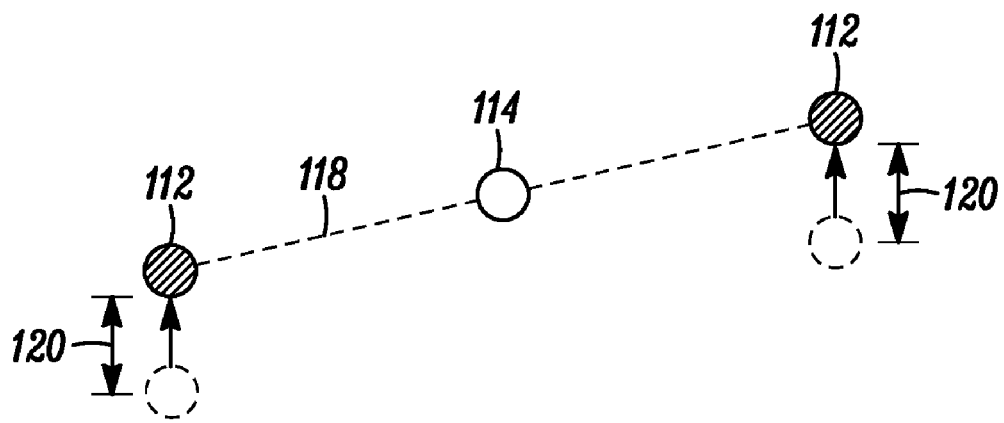
FIG. 8 is a view of the three of the terrain elevation data points of FIG. 6 after being modified in accordance with one embodiment of the present invention.

The calculations described above result in only the modification of the elevation of the respective active data point 112. However, the elevation modifications that are performed for one active data point 112 are later reciprocated by the calculations performed. For example, the determination regarding active data point pair $112_1$ and $112_2$ is made in reference to both active data point $112_1$ and active data point $112_2$. This reciprocity results in the elevation values of both active data points $112_1$ and $112_2$ being increased by, in one embodiment, the distance 120, as shown in FIG. 8. It should also be noted that, in at least one embodiment, the active data point elevations (i.e., the unmodified) elevations are those that are used in all such calculations (i.e., the modified/increased elevations are only used for the generation of the digital terrain).

Referring to both FIGS. 6 and 7, at least in the depicted embodiment, due to the uniform size of the elevation posts 116 (FIG. 5), within each pair of active data points 112, the distance 122 (as measured in the x-y plane) between the particular active data point 112 and the passive data point 114 is the same as the distance between the passive data point 114 and the adjacent active data point 112. Therefore, the determination of the elevation of the passive data point 114 relative to the line 118 may be performed by simply comparing the average of the elevations of the two active data points 112 to the elevation of the passive data point 114. In such cases, the modified elevation of the particular active data point 112 may be calculated as the sum of the elevation of the particular active data point 112 and the difference between the elevation of the passive data point 114 and the average of the elevation of the active data points 112.

Figure 9:
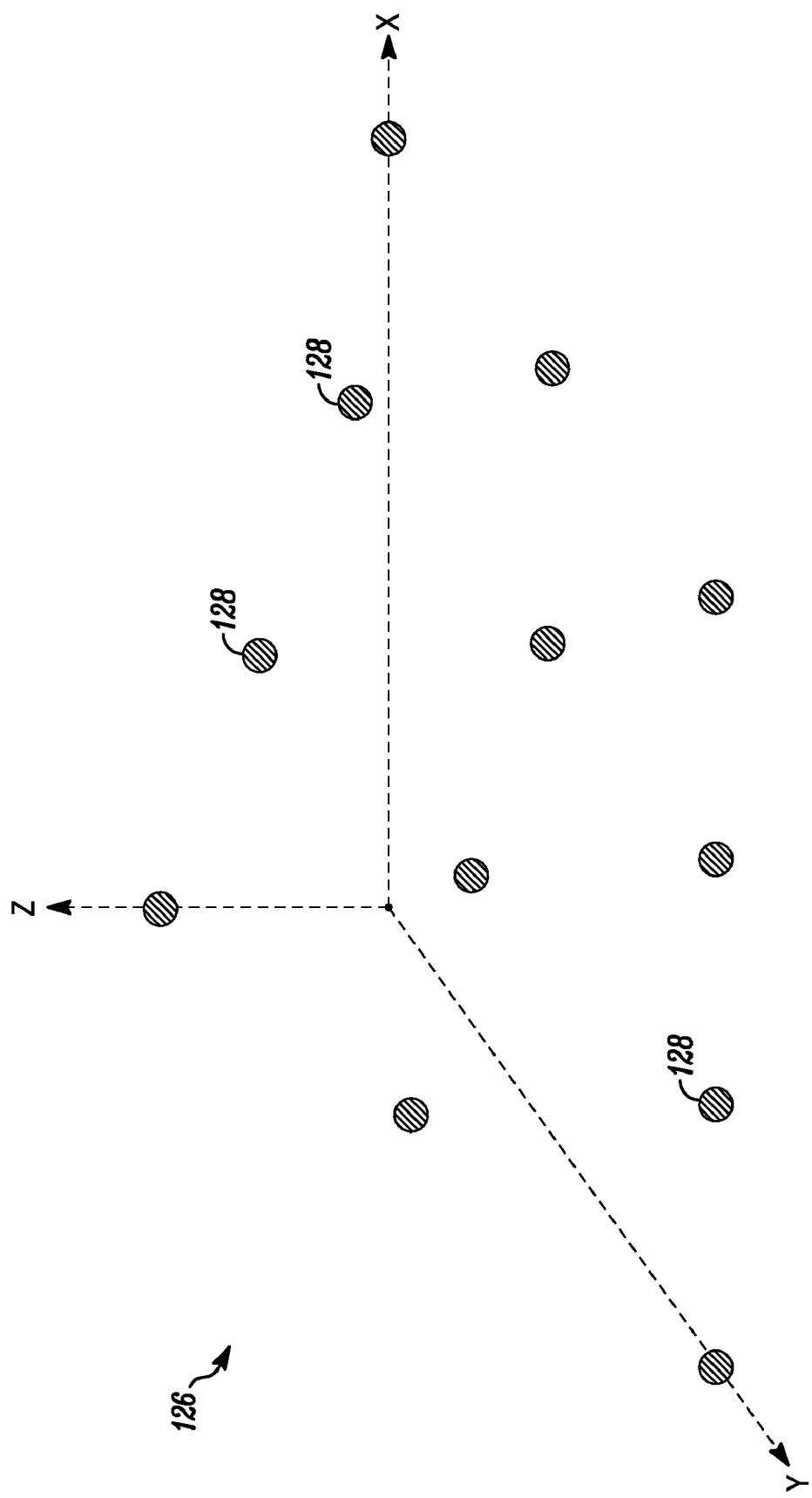
FIG. 9 is an isometric view of an array of digital terrain data points in conjunction with a three-dimensional Cartesian coordinate system.
Figure 10:
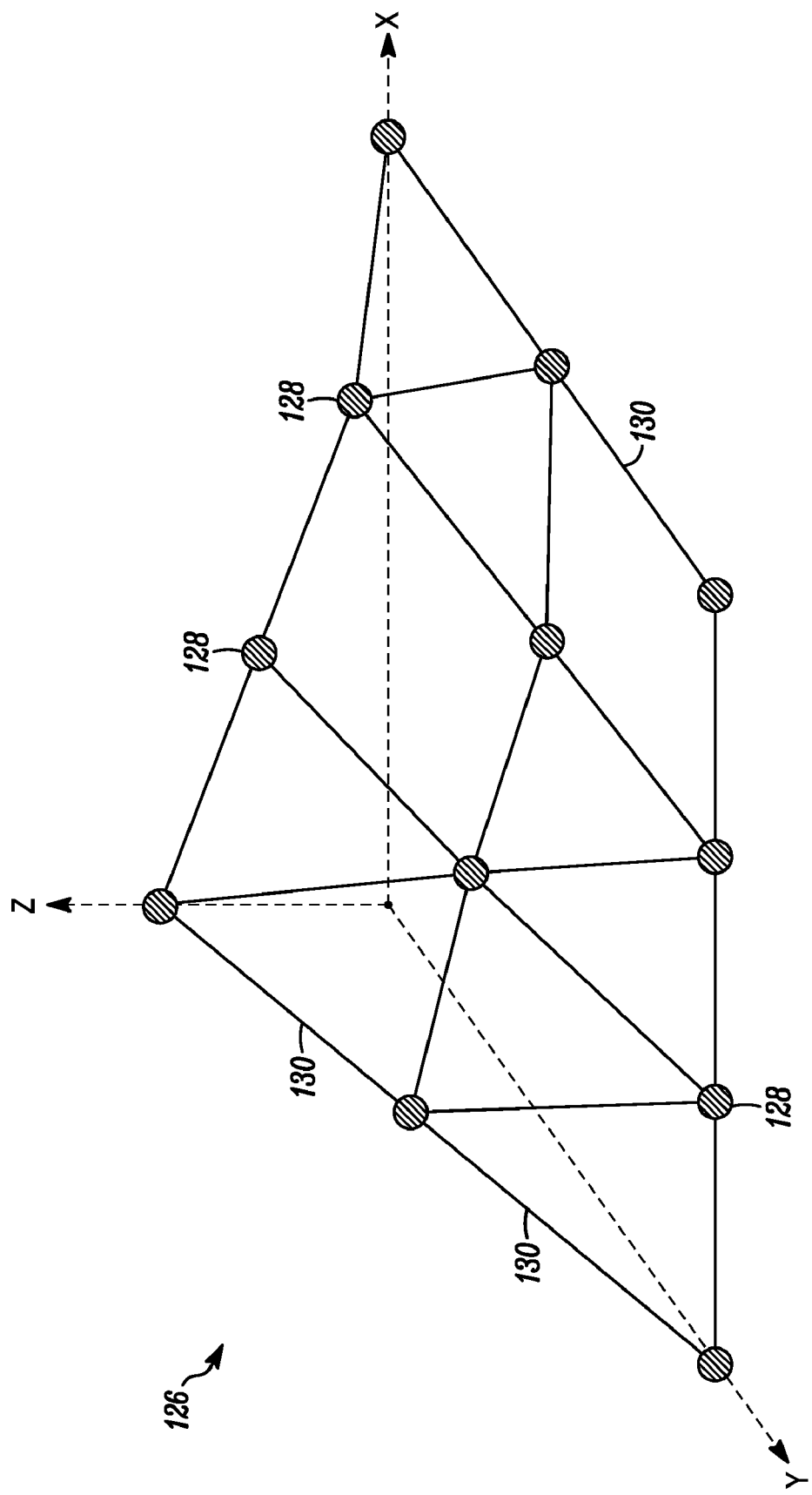
FIG. 10 is an isometric view of the array of digital terrain data points of FIG. 8 with digital terrain lines shown.
Figure 11:
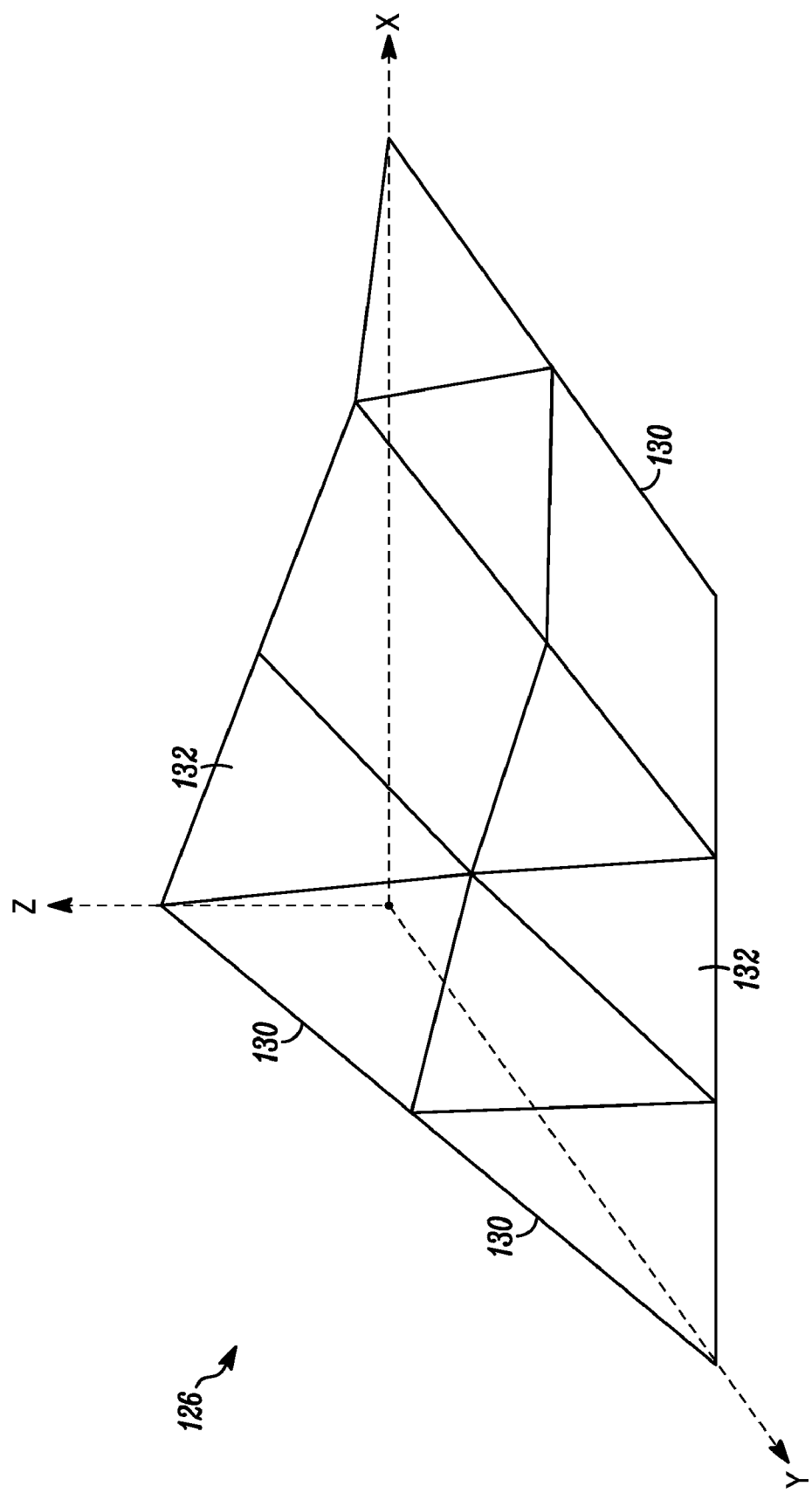
FIG. 11 is an isometric view of the array of digital terrain data points of FIG. 9 with digital terrain polygons shown.

FIGS. 9-11 illustrate the generation of a digital terrain (or portion of a digital terrain) for display on the display screen 86, based on the actual terrain data points and calculations described above. After the calculations have been performed for all of the active data points 112, the highest stored elevation for each active data point 112 is used to generate a corresponding digital terrain data point. As shown in FIG. 8, an array 126 of digital terrain data points 128 is generated. The digital terrain data points 128 have similar x/y coordinates as the active data points 112 shown in FIG. 4. However, as described above the z-values, or elevations, of some of the digital terrain data points 128 vary compared to those of the active data points 112. Thus, the x, y, and z-axes of the digital terrain also correspond to the longitude, latitude, and elevation of the actual terrain in a similar manner to the axes shown in FIGS. 4 and 5. Also of interest in FIG. 8 is the lack of any data points directly corresponding to the passive data points 114 shown in FIG. 4.

Figure 12:
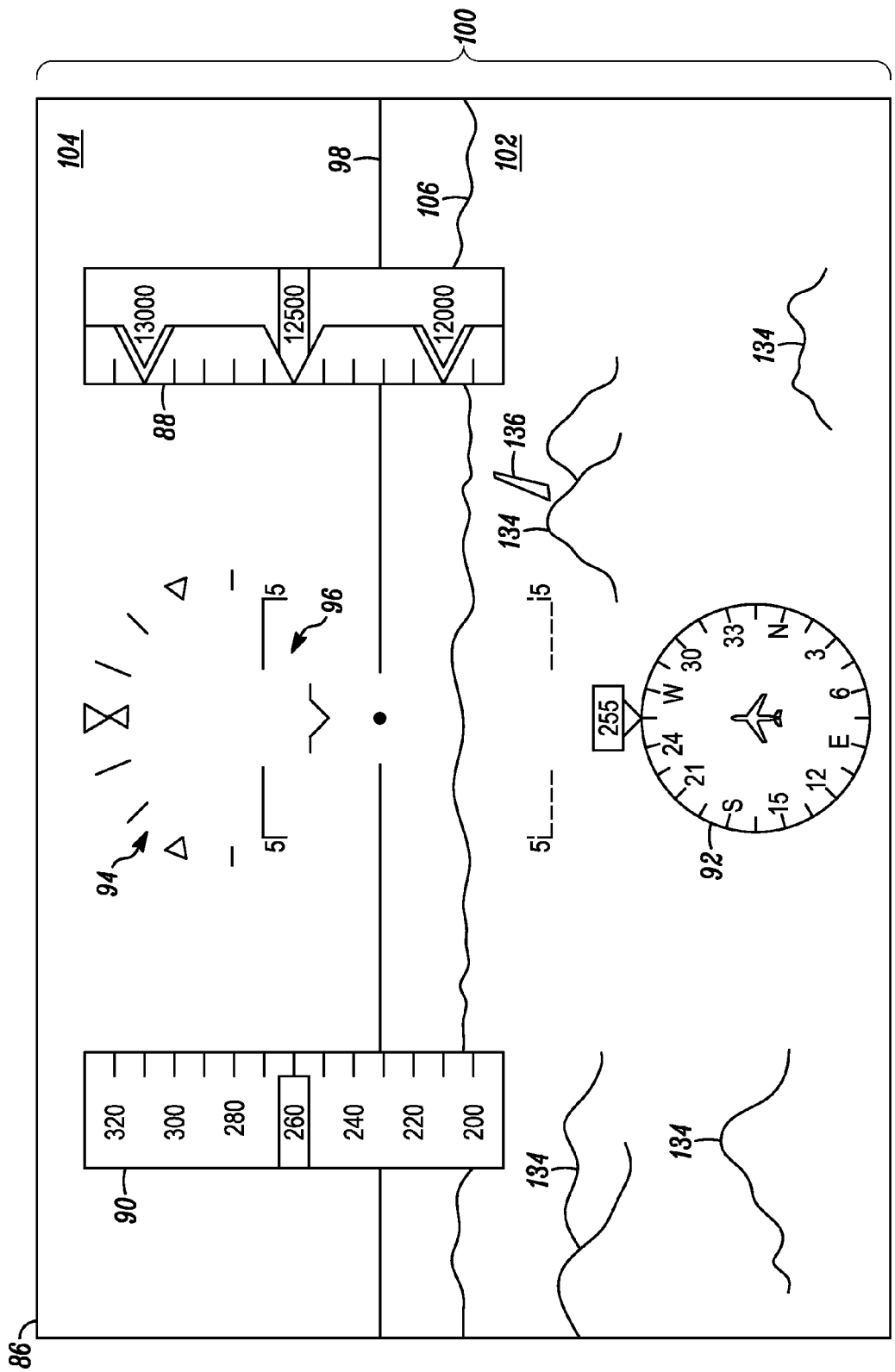
FIG. 12 is a top view of the primary flight display of FIG. 3 with a digital terrain generated according to one embodiment of the present invention displayed thereon.

As shown in FIGS. 10 and 11, the digital terrain data points 128 are then interconnected by digital terrain lines 130 to form digital terrain polygons (e.g., triangles) 132. The digital terrain polygons 132 may then be displayed on the display screen 86 as the terrain portion 102 of the terrain image 100. As shown in FIG. 12, such a terrain portion 102 of the terrain image 100 may include various terrain features 134, such as mountains, hills, and valleys, which are generated using the method described above. The terrain portion 102 may also include various landmarks 136, such as runways and roads.

Figure 13:
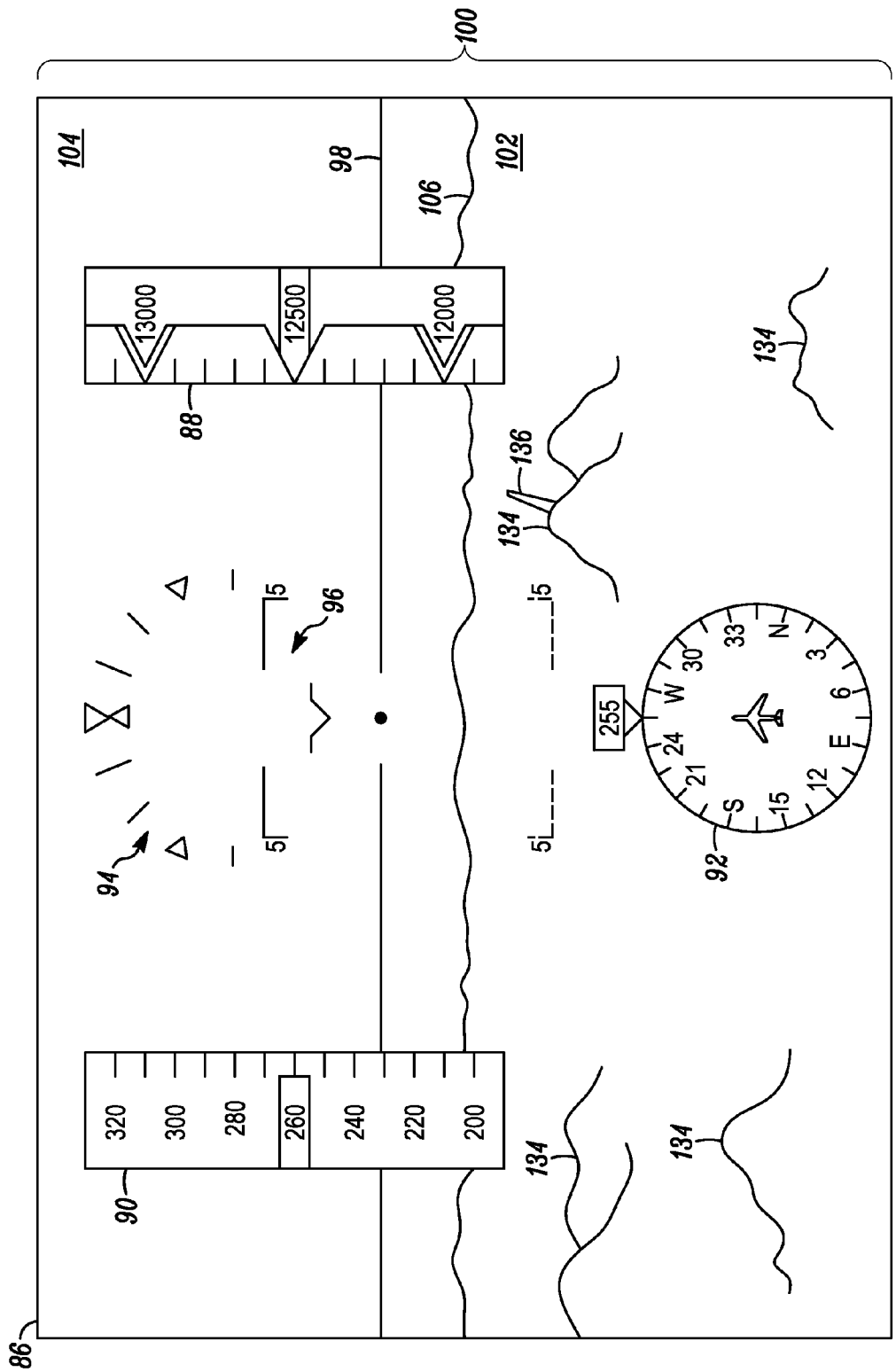
FIG. 13 is a top view of the primary flight display of FIG. 3 with a digital terrain generated according to a prior art method displayed thereon.
Figure 14:
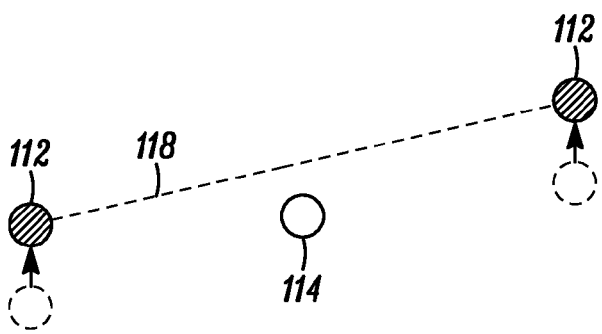
FIG. 14 is a view of the three terrain elevation data points of FIG. 6 after being modified in accordance with another embodiment of the present invention.
Figure 15:
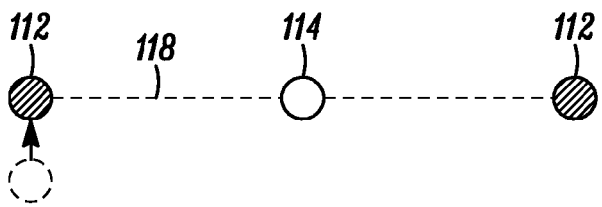
FIG. 15 is a view of the three terrain elevation data points of FIG. 6 after being modified in accordance with a further embodiment of the present invention.
Figure 16:
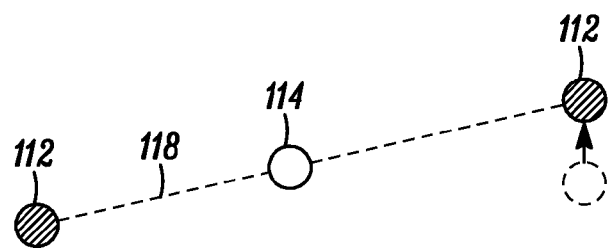
FIG. 16 is a view of the three terrain elevation data points of FIG. 6 after being modified in accordance with yet a further embodiment of the present invention.
Figure 16:
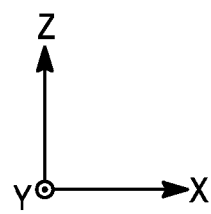

One advantage of the method and system described above is that because the elevation modifications are made to both active data points within a pair the accuracy with which slopes are displayed is improved. As a result, the likelihood that terrain features on the digital terrain will inaccurately obscure landmarks is reduced. For example, FIGS. 12 and 13 illustrate images generated using the method described above and a prior art method, respectively. In the image shown in FIG. 12, the entire landmark 136 (i.e., a runway) is visible behind the nearby terrain feature 134. However, in the image shown in FIG. 12, the front portion of the landmark 136 is blocked from view by the terrain feature 134 that lies nearby.

Another advantage is that because of the calculations and modifications to the elevations of the data points a digital terrain is generated that safely indicates the actual contours of the terrain to the user. Another advantage is that because not all of the available terrain elevation data is utilized processor resources are conserved and performance of the display device, as well as the entire system, is improved. Additionally, because the determinations described above are performed on a single pass (i.e., without having to re-check any of the data points) system performance is even further improved.

Other embodiments may alter the elevations of the active data points by different amounts. For example, in the embodiment shown in FIG. 14, the elevations of the active data points 112 has been increased such that the passive data point 114 is below the line 118 interconnecting the two active data points 112 while maintaining the original slope between the two active data points 112. In the embodiment shown in FIG. 15, only the elevation of the active data point 112 with the lower elevation is modified. The embodiment shown in FIG. 15 may result in an improved accuracy in the displaying of the elevation of actual terrain features. In the embodiment shown in FIG. 16, only the elevation of the active data point with the higher elevation is modified. The embodiment shown in FIG. 16 may result in an improved accuracy in the displaying of the side portions of actual terrain features.

Figure 17:
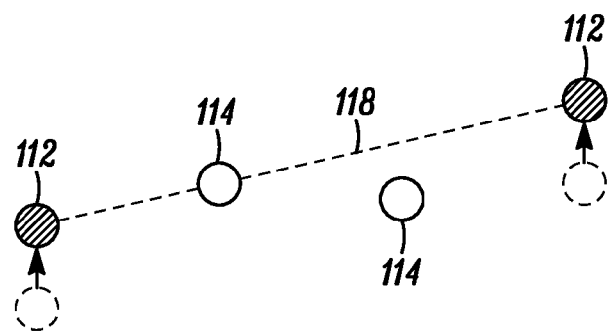
FIG. 17 is a view of three terrain elevation data points in accordance with yet a further embodiment of the present invention.
Figure 17:
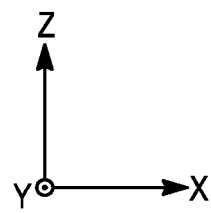

In the embodiment shown in FIG. 17, two passive data points 114 are positioned between the pair of active data points 112. Such an embodiment may be implemented in a manner similar to that described above with the addition of the determinations regarding the elevations being performed for both passive data points 114 and the elevations of the active data points being increased based on the passive data point with the higher elevation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

We claim:
1. A method for displaying a digital terrain to a user of a vehicle comprising:
   receiving first, second, and third actual terrain data points, the third actual terrain data point being between the first and second actual terrain data points;
   if the third actual terrain data point is above a line interconnecting the first and second actual terrain data points, modifying by a precessor the first actual terrain data point such that the third actual terrain data point is not above a line interconnecting said modified first actual terrain data point and the second actual terrain data point; and displaying a digital terrain to the user of the vehicle, the digital terrain including a first digital terrain data point corresponding to said modified first actual terrain data point.

2. The method of claim 1, wherein said modification of the first actual terrain data point comprises increasing an elevation of the first actual terrain data point from an actual terrain elevation to a modified terrain elevation.

3. The method of claim 2, wherein if the third actual terrain data point is not above a line interconnecting the first and second actual terrain data points, the first digital terrain data point corresponds to the first actual terrain data point.

4. The method of claim 3, wherein the digital terrain further comprises second and third digital terrain data points corresponding to the second and third actual terrain data points and first, second, and third axes, the first and second axes jointly corresponding to a longitude and latitude of an actual terrain and the third axis corresponding to an elevation of the actual terrain.

5. The method of claim 4, wherein a plane interconnecting the first, second, and third digital terrain points is parallel to the third axis.

6. The method of claim 5, wherein the digital terrain comprises a line interconnecting the first digital terrain data point and the second digital terrain data point.

7. The method of claim 6, further comprising:
receiving fourth and fifth actual terrain data points, the fifth actual terrain data point being between the first actual terrain data point and the fourth actual terrain data point;
if the fifth actual terrain data point is above a line interconnecting the modified first actual terrain point and the fourth actual terrain data point, re-modifying the first actual terrain data point by increasing the elevation of the first actual terrain data point from the modified terrain elevation to a re-modified terrain elevation such that the fifth actual terrain data point is not above a line interconnecting said re-modified first actual terrain data point and the fourth actual terrain data point; and
wherein the first digital terrain data point corresponds to said re-modified first actual terrain data point.

8. The method of claim 7, wherein the digital terrain further comprises a line interconnecting the first digital terrain data point and the fourth digital terrain data point and a line interconnecting the second digital terrain data point and the fourth digital terrain data point.

9. The method of claim 8, wherein the digital terrain further comprises a polygon interconnecting the first, second, and fourth digital terrain data points and said lines interconnecting the first, second, and fourth digital terrain data points.

10. The method of claim 9, wherein in an plane defined by the first and second axes, a distance between the first and third digital terrain data points is approximately the same as a distance between the second and third digital terrain data points and a distance between the first and fifth digital terrain data points is approximately the same as a distance between the fourth and fifth digital terrain data points.

11. A method for displaying a digital terrain to a user of an aircraft comprising:
receiving an array of actual terrain data points comprising a plurality of active actual terrain data points and a plurality of passive actual terrain data points, the array being arranged such that each pair of adjacent active actual terrain data points has a passive actual terrain data point therebetween;
for each pair of adjacent active actual terrain data points,
determining if the passive actual terrain data point therebetween is above a line interconnecting the pair of adjacent active actual terrain data points;
if the passive actual terrain data point is above the line, modifying by a precessor at least one of the active actual terrain data points within the pair such that the passive actual terrain data point is not above the line; and
displaying a digital terrain to the user of the aircraft, the digital terrain comprising a plurality of digital terrain data points corresponding to said modified actual terrain data points.

12. The method of claim 11, wherein the plurality of digital terrain data points further correspond to un-modified actual terrain data points for each pair of adjacent active actual terrain data points in which the passive actual terrain data point therebetween is not above the line interconnecting the pair of adjacent active actual terrain data points.

13. The method of claim 12, further comprising storing the plurality of digital terrain data points in an array corresponding to the active actual terrain data points.

14. The method of claim 13, wherein said arrays are arranged in a three-dimensional Cartesian coordinate system having a first, a second, and a third axis, the first and second axes jointly corresponding to a longitude and latitude of the actual terrain data points and the third axis corresponding to an elevation of the actual terrain data points.

15. The method of claim 14, wherein said modification of at least one of the active digital terrain data points comprises moving the at least one of the active digital terrain data points in a direction parallel to the third axis, each active digital terrain data point is within more than one of the pairs of active digital terrain data points, and the digital terrain does not comprise data points corresponding to the passive digital terrain data points.

16. An avionics system comprising:
a display device that is viewable by a user of an aircraft: and
a processor in operable communication with the display device, the processor being configured to:
receive first, second, and third actual terrain data points, the third actual terrain data point being between the first and second actual terrain data points;
if the third actual terrain data point is above a line interconnecting the first and second actual terrain data points, modify the first actual terrain data point such that the third actual terrain data point is not above a line interconnecting said modified first actual terrain data point and the second actual terrain data point; and
display a digital terrain to the user of the aircraft, the digital terrain including a first digital terrain data point corresponding to said modified first actual terrain data point.

17. The system of claim 16, wherein said modification of the first actual terrain data point comprises increasing an elevation of the first actual terrain data point from an actual terrain elevation to a modified terrain elevation.

18. The system of claim 17, wherein if the third actual terrain data point is not above a line interconnecting the first and second actual terrain data points, the first digital terrain data point corresponds to the first actual terrain data point.

19. The system of claim 18, wherein the digital terrain further comprises second and third digital terrain data points corresponding to the second and third actual terrain data points and first, second, and third axes, the first and second axes jointly corresponding to a longitude and latitude of an actual terrain and the third axis corresponding to an elevation of the actual terrain and a plane interconnecting the first, second, and third digital terrain points is parallel to the third axis.

20. The system of claim 19, wherein the processor is further configured to:
   receive fourth and fifth actual terrain data points, the fifth actual terrain data point being between the first actual terrain data point and the fourth actual terrain data point;
   if the fifth actual terrain data point is above a line interconnecting the modified first actual terrain point and the fourth actual terrain data point, re-modify the first actual terrain data point by increasing the elevation of the first actual terrain data point from the modified terrain elevation to a re-modified terrain elevation such that the fifth actual terrain data point is not above a line interconnecting said re-modified first actual terrain data point and the fourth actual terrain data point; and
   wherein the first digital terrain data point corresponds to said re-modified first actual terrain data point.

\* \* \* \* \*